Patented May 2, 1933

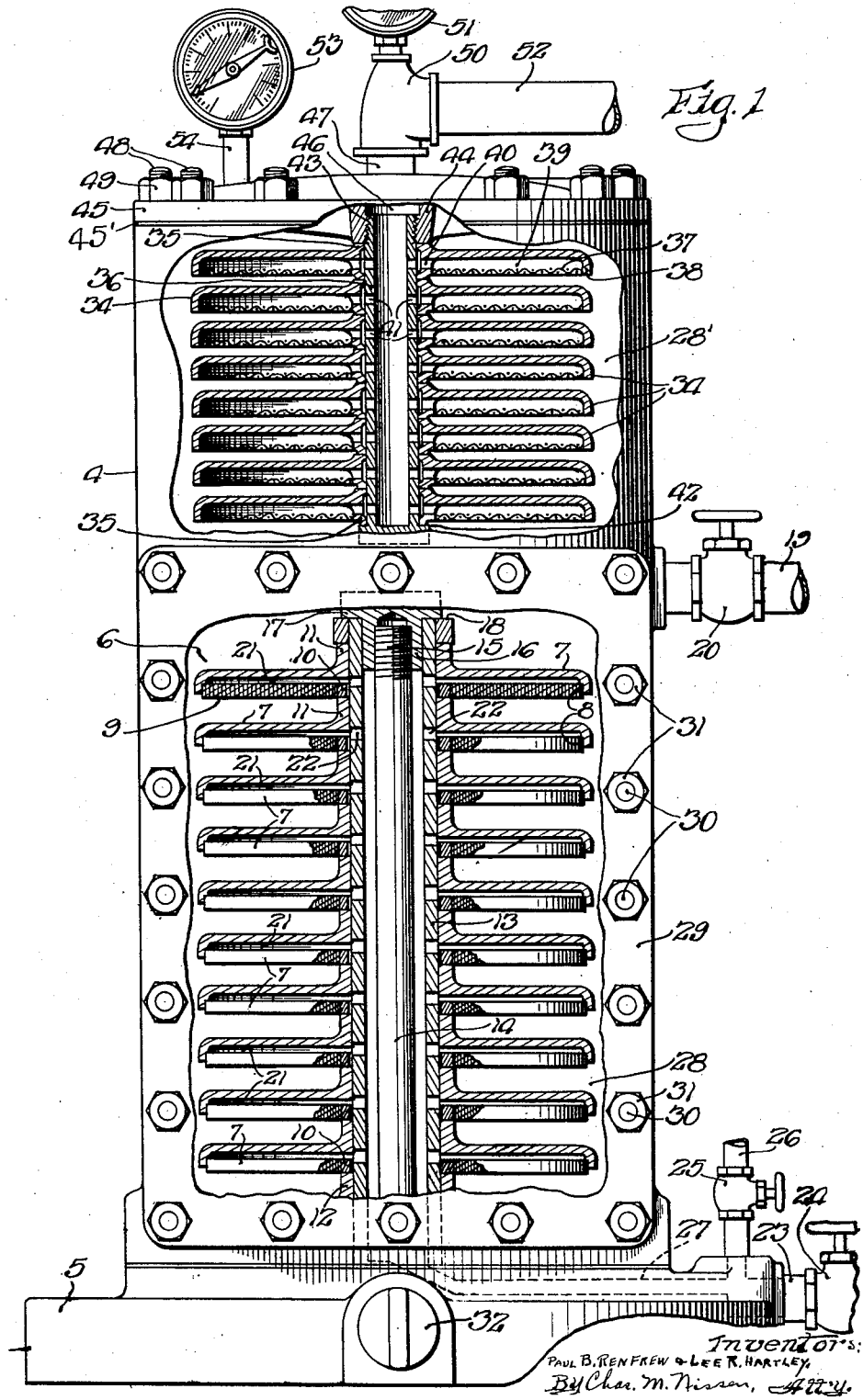

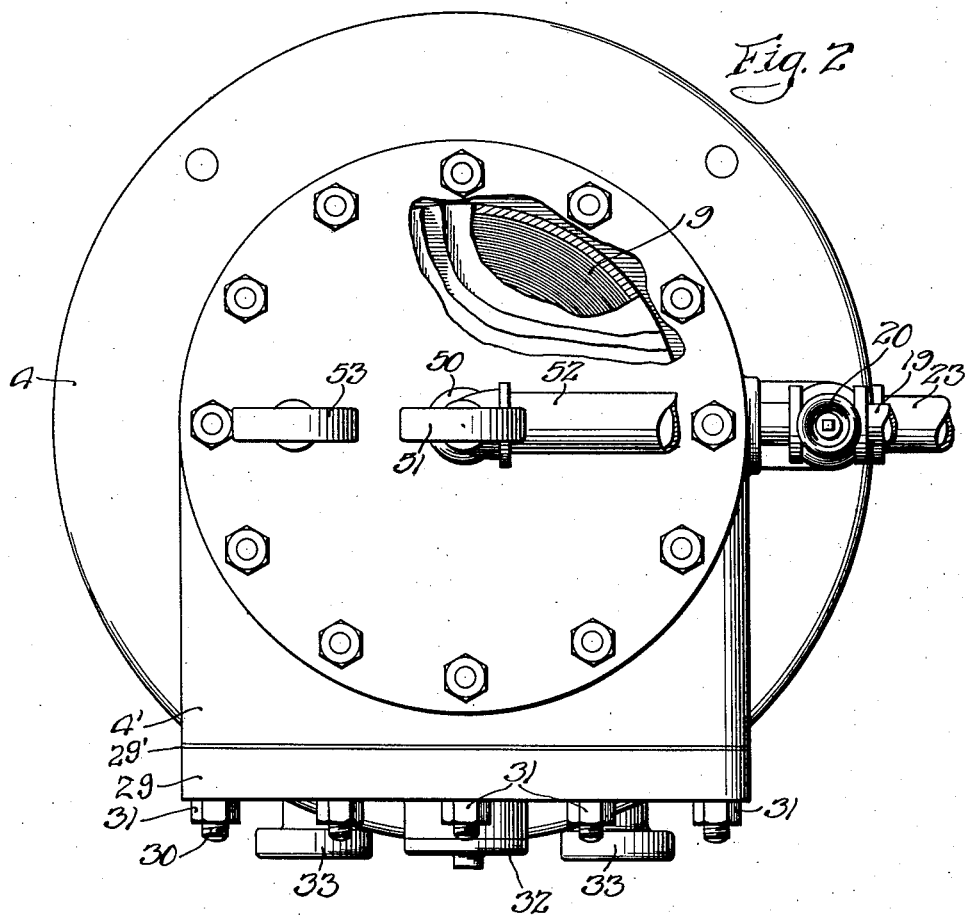

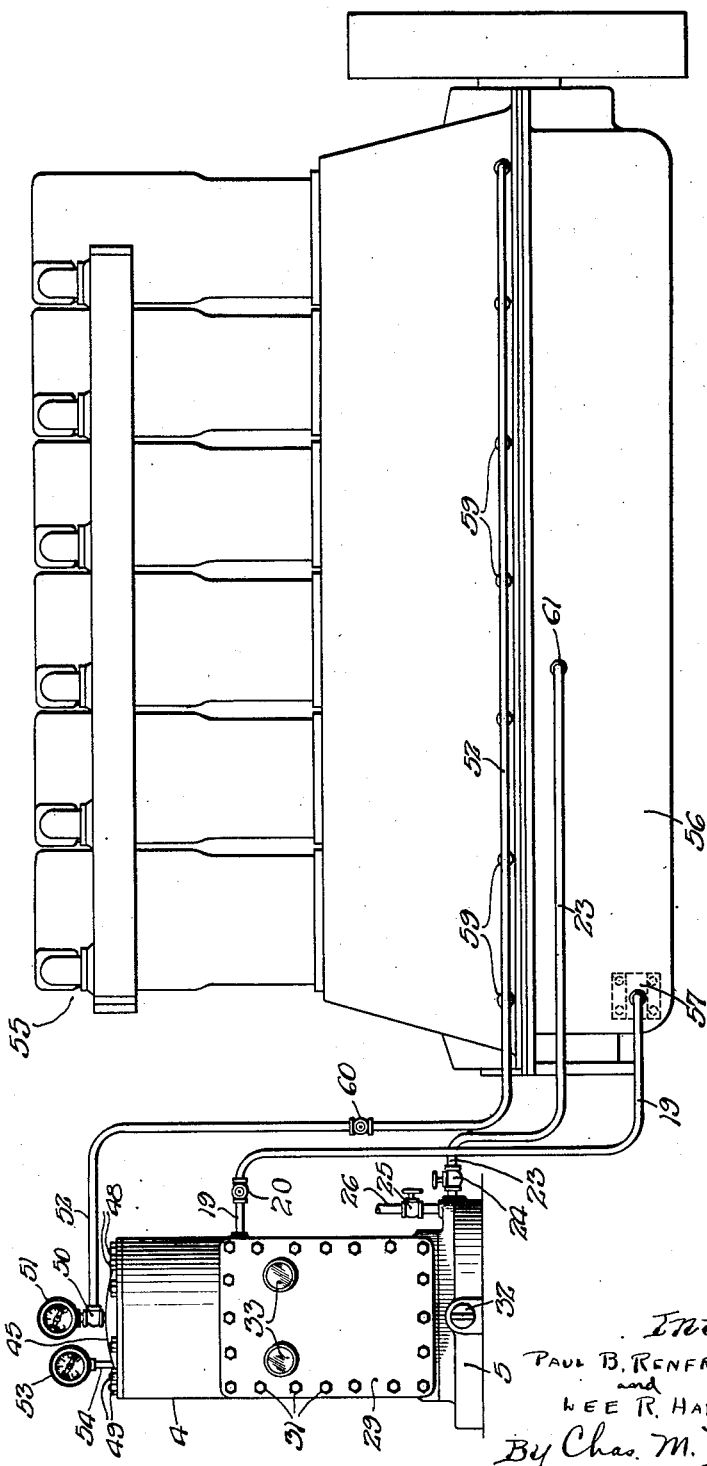

1,906,418

UNITED STATES PATENT OFFICE

PAUL B. RENFREW AND LEE R. HARTLEY, OF FORT WAYNE, INDIANA, ASSIGNORS TO S. F. BOWSER & COMPANY, INC., OF FORT WAYNE, INDIANA, A CORPORATION OF INDIANA

FILTERING APPARATUS

Original application filed July 20, 1928, Serial No. 294,213. Divided and this application filed August 2, 1929. Serial No. 383,016.

Our invention relates to a system of filtration of lubricants and one of its objects is the provision of improved and efficient filtering apparatus so connected and arranged as to obtain a free flow of the lubricant while filtering out the coarser impurities and a restricted flow of the lubricant to eliminate the fine particles of impurities.

More particularly it is the object of the present invention to provide an improved and efficient filtration system for the lubricant in the crank case of an internal combustion engine by arranging the filtering apparatus in multiple and permitting comparatively free flow of the lubricant back to the source of supply while filtering out the coarser particles of impurities and also the flow of the lubricant to filter out the finer particles of impurities from the lubricant before permitting it to pass back to the source of supply.

Another object of the invention is the provision of two types of filters in a filtration system connected to a reservoir containing the liquid to be filtered, one filter being adapted to filter the coarse particles of impurities and the other the fine particles of impurities, the connections between the filters and the reservoir being such as to permit free flow through one filter and restricted flow through the other, the flow through the latter being obtained by hydraulic pressure.

A further object of the invention is the provision of a system of filtering the lubricant in the crank case of an internal combustion engine of filtering mechanism and connections for affording fluid pressure to effect back-washing to loosen caked impurities from the entrance sides of the filtering mechanism.

Other objects of the invention will appear hereinafter, the novel features and combinations being set forth in the appended claims.

The present application is a division of our copending application Serial No. 294,213, filed July 20, 1928, for an improvement in filtering apparatus.

Referring to the accompanying drawings—

Fig. 1 represents our improved multiple type of filtering apparatus with portions of the casing broken away to show in section the construction of the interior filter elements;

Fig. 2 is a plan view of Fig. 1 with portions broken away to show the construction of the lower set of filter units; and Fig. 3 is a view showing our improved automatic system for filtering lubricant in the crank case of a Diesel engine or any other type of internal combustion engine.

In the accompanying drawings, Fig. 1 shows a casing 4 mounted on a bed plate 5. In the lower portion of the casing 4 is mounted a multiple filter 6 comprising ten filter units each having an inverted cup in the periphery of which at 8 is soldered or otherwise secured a porous disc filter element 9. The filter elements 9 each comprising a metal ribbon or tape so constructed and wound as to form a flat porous disc having a thickness equal to the width of the ribbon or tape.

The filter elements 9 constitute porous disc filters inasmuch as they are constructed of metal ribbon or tape having thereon spaced separators or cross-bars extending transversely of the tape between the edges thereof so that when the metal ribbon or tape is wound into a disc, minute passageways will be formed between the entrance side and the discharge side of the disc. The ribbon or tape is of thin metal, such as copper or other metal, of sufficient strength to permit tight winding without undue distortion, compression or stretching of the metal itself.

The tape or ribbon of thin metal is wound on the hub 10 into very compact substantially concentric layers to form a disc of laminations by means of one length of tape, which disc is soldered or otherwise secured at 8 to the annular seat at the periphery of the cup 7. The uniformly spaced cross-bars or cross-ribs or abutments form direct tubular passageways for the oil to filter through from the bottom side of the filter element to the chamber 21 within the cup 7. The laminations are spaced by means of separators or cross-bars and these in turn co-act with the smooth backs of the next adjacent laminations to form parallel passageways to make the disc filter element porous over its entire area. By mounting the filter units in multiple as shown in Fig. 1 in the lower portion of the casing 4, a large porous area for filtration is secured in a very compact space in the chamber 28.

The hub 10 of each filter unit is adapted to rest on the next lower hub 11 of the cup 7. At the bottom of the casing is an annular support 12 on which the lowermost hub 10 may rest as shown in Fig. 1. The upwardly projecting hubs 11 of the inverted cups 7 fit over the vertical pipe 13, the lower end of which is open and fits into the cylindrical bore in the support 12.

A vertical rod 14 secured at its lower end to the bed plate 5 is mounted concentrically with the tube 13 but is of smaller diameter than the inner diameter of the tube 13 so as to provide sufficient space for free flow of filtered oil from the upper or discharge surfaces of the disc filter elements 9. The upper end of the rod 14 is screw threaded at 15 to receive a nut 16 which is provided with an annular shoulder 17, the latter being adapted to rest on the ring collar 18, thereby clamping the hubs 10 and 11 of the filter elements rigidly to the support 12 and the tube 13. When the filter units 6 are thus assembled they will be held rigidly connected to each other and to the bottom of the casing 4.

The dirty or used liquid from a reservoir such as the crank case of an internal combustion engine may be permitted to flow through the pipe 19 into the casing 4 by opening the valve 20. When sufficient pressure is exerted on the incoming liquid it may be forced through the porous filter elements 9 in multiple into the chambers 21 above the filter elements 9. The filtered liquid may then pass through the ports 22 into the pipe 13 and thence through a passageway 27 in the bed plate 5 to the pipe 23. The flow of the filtered liquid back to the supply reservoir may be controlled by the valve 24.

When the valve 24 is closed and the valve 25 is open, compressed air may be introduced through the pipe 26 into the passageway which leads to the bottom of the pipe 13. Such compressed air will be forced through the ports 22 into the chambers 21 above the filter elements 9 to exert pressure downwardly and force from the entrance or lower sides of the filter elements such impurities as may have been caked thereon to such an extent as to interfere with the efficient operation of the multiple filtering apparatus in the lower portion of the casing 4.

The passageway between the pipes 23 and 26 and the bottom of the pipe 13 is shown diagrammatically at 27 as being located in the bed plate 5. It should be understood that the pipes 23 and 26 communicate through the passageway 27 with the bottom of the pipe 13 only and not with the bottom or interior of the casing 4 in the chamber 28 in which the multiple filtering apparatus is mounted.

The lower portion of the casing 4 is so constructed as to provide for a large rectangular opening closed by a vertical flat plate 29 securely bolted in closed position by a plurality of bolts 30 and nuts 31 distributed around the periphery of the plate 29 as shown in Figs. 1 and 2. The lateral extension 4' of the casing 4 may have fixed thereto the bolts 30. By loosening all of the nuts 31 and removing them, the plate 29 may be entirely removed from the casing 4, thus exposing to view and rendering accessible all of the porous filter elements so that they may be individually mechanically cleaned. Whatever impurities accumulate on the entrance sides of the discs may be scraped off and permitted to fall on top of the inverted cups 7, from which the impurities may be raked to the bottom of the chamber 28.

After the filter units have been individually cleaned, a rectangular gasket 29' may be placed over the bolts 30 and the rectangular face at the edge of the opening into the chamber 28 so that when the plate 29 is replaced and bolted firmly to the casing a liquid-tight fit will be secured so that considerable pressure, for example, 150 pounds per square inch, may be exerted on the bottoms of the filter units by the incoming lubricant pumped into the casing 4 under pressure.

Such impurities as are removed by sedimentation or the impurities which drop from the filter units to the bottom of the chamber 28 may be removed by unscrewing the plug 32 from an opening in the bottom of the bed plate 5, which opening communicates with the bottom of the chamber 28. It should be understood, however, that the drain port which is normally closed by the screw plug 32 communicates only with the bottom of the chamber 28 and not with the interior of the pipe 13 or with the passageway 27.

By arranging the porous discs horizontally with the entrance sides on the bottom the coarser particles which are separated from the liquid in the chamber 28 may pass by gravity to the upper faces of the cups 7 and thence to the bottom of the casing 4 to be removed through the opening normally closed by the screw plug 32. The arrangement of the filter units with the entrance faces on the bottom also facilitates mechanical cleaning when the cover plate 29 is removed.

It should be understood, however, that the fine particles of carbon or other material separated from the liquid such as oil by the porous disc filters need not be very frequently cleaned from the entrance sides of the porous filter elements because the collection and caking of such carbon and other fine particles forms in itself a filtering layer and may be permitted to remain until the efficiency of the filtering apparatus is interfered with, as indicated by excessive pressure at the filter gauge 53. So long as the layer of carbon or other fine material remains in its porous condition and the heavier particles or coarser materials fall by gravity to the tops of the cups 7, the filter elements 9 are not deemed to be clogged.

In order that the condition of the liquid such as oil in the chamber 28 may be observed at any time, sight-windows 33, 33 may be provided in the plate 29 as shown in Fig. 3. By means of these sight-windows the condition of the bottoms of one or two of the porous disc filters may also be observed so as to enable the attendant to decide when the flushing or backwashing operation should be performed by closing the valve 24 and opening the valve 25 and permitting air pressure to be introduced through the pipe 26 and through the passageway 27 into the tube 13 and the chambers 21 above the porous discs 9. The attendant may also judge from the appearance of the liquid at the sight-windows 33 when the plug 32 should be removed to drain the accumulation of sludge or impurities at the bottom of the chamber 28.

In the upper portion of the casing 4 in the chamber 28' is another multiple filter each unit of which comprises an inverted cup 34 having a hub 35 fitting over a tube 36. Each unit also has a filter screen 37 secured to the periphery 38 and to the hub 35 to form a chamber 39 which is in communication through the ports 40 and 41 with the interior of the pipe 36. The mesh of the screen 37 may be varied as desired, but it is intended that it shall be sufficiently free to filter out the coarser particles of impurities from the oil or other liquid being purified.

The tube or pipe 36 is closed at its lower end and provided with an annular seat 42 while the upper end of the pipe 36 is screw-threaded at 43 to the bottom center portion 44 of the cover plate 45. The upper end of the tube 36 is open and in communication with a port 46 to which the pipe 47 is connected.

It will thus be seen that the lowermost filter unit has its hub 35 resting on the annular seat 42 at the closed bottom of the tube 36 and the remaining filter units are stacked one above another with their hubs in liquid-tight fitting relation with the pipe 36. By providing the lower end of the pipe 36 with a nut-head the whole series of filter units may be clamped rigidly to the cover plate 45.

By means of the stud bolts 48 and the nuts 49 an annular gasket 45' between the cover plate 45 and the top of the casing 4 may be clamped in position to form a liquid-tight fit. When the nuts 49 are loosened and removed the cover plate 45 together with the entire stack of eight filter units in the chamber 28' may be removed from the top of the casing 4 for the purpose of cleaning the accumulation of impurities on the bottoms of the filter screens 37. By means of a connection 50 an engine bearing gauge 51 may be connected to the pipe 47 and also to the pipe 52 as shown in Figs. 1 and 3. A filter gauge 53 may be connected by means of a pipe 54 to the cover plate 45 so as to be in communication with the chamber 28'.

In Fig. 3 we have shown a Diesel engine having a crank case 56 in the bottom of which is mounted a pump 57 for pumping the oil or lubricant from the bottom of the crank case 56 through the pipe 19 into the casing 4 when the valve 20 is open. It should be understood that the interior of the casing 4 is open from top to bottom and that the space in which the porous disc filters 6 are mounted is the chamber 28 and the space in which the screen filter units are mounted is the chamber 28' and these two chambers are in direct communication with each other.

As shown in Fig. 3, the pipe 52 is connected at the various points 59 so as to direct filtered oil from the top of the casing 4 or from the chamber 28' to the bearings of an internal combustion engine when the valve 60 is open and the circulating system is adjusted for flow of lubricant from the casing 4 to the pipe 52.

When the multiple screen filter in the chamber 28' of the casing 4 is in good operating condition so as to permit free flow of filtered oil to the engine bearings through the pipe 52 the pressure on the engine bearings may be regulated by the valve 60 so as to secure the desired reading of the pressure gauge 51. When the filter screens clog up with filtered material the pressure in the pipe 52 tends to decrease and when this is indicated by the pressure gauge 51 the valve 60 may be opened wider so as to increase the flow and the pressure to the bearings of the engine.

The pressure exerted by the pump 57 on the oil in the casing 4 will be indicated by the filter gauge 53 since this gauge is in direct communication through the pipe 54 with the chambers 28, 28'. Whenever the engine operates the pump 57 will be operated and the flow of oil and the pressure at the engine bearings or at the connections 59 may be regulated by the valves 20 and 60, the valve 20 controlling the flow through the pipe 19 and the valve 60 controlling the flow through the pipe 52. The pressure within the casing 4 will be indicated by the filter gauge 53 and the pressure in the pipe 52 and at the engine bearing connections 59 will be indicated by the pressure gauge 51. By means of the filter gauge 53 the condition of the screen filter in the chamber 28' may be determined because when the screens become clogged so as to interfere with their efficiency, the pressure indication in the gauge 53 will become greater.

It should be noted that the porous disc filter units are arranged in a by-pass as to the circulating system for the lubrication of the engine bearings because the passageway 27 leading from the bottom of the pipe 13 is connected through the pipe 23 to the point 61 in the upper portion of the crank case reservoir 56 as shown in Fig. 3. The porous disc filters are so constructed as to require considerable liquid pressure for their operation, for instance, 150 pounds per square inch. While the thickness of the tape and the depth of the grooves or cross-channels thereon may be varied according to conditions and the liquid to be filtered, it has been found practicable in filtering lubricating oil used for the bearings of Diesel engines or other internal combustion engines to use copper ribbons three-eighths of an inch in width and thirty-six ten-thousandths of an inch in thickness with the cross-ribs thereon four ten-thousandths of an inch thick and spaced apart to form grooves or channels four ten-thousandths of an inch in depth and one-eighth of an inch in width, leaving the cross-ribs approximately one-sixteenth of an inch in width. It should be understood, however, that we do not wish to be limited to these particular dimensions and that they are specified merely to illustrate the character of the passageways between the flat faces of the filter elements between the edges of the laminations and that these passageways are not such as to permit flow of oil therethrough by gravity and that pump pressure is intended to be used to force the oil through such passageways.

The desired pressure to operate the porous filter elements may be secured by regulation of the valves 24, 20 and 60. While the engine is operating the automatic circulating lubricating system for the bearings should not be interfered with; that is to say, the lubrication of the engine bearings should go on continuously, but the finer particles of material may be filtered out in a by-pass or a circulation which is in parallel or multiple with the engine bearing circulation. The pump 57 pumps the used lubricant from the bottom of the crank case 56 and introduces it into the casing 4 through the pipe 19. Here the oil may divide at a greatly reduced rate of flow, part going through the screen filters to take out the coarser impurities and then the lubricant flows through the connections 59 to the engine bearings and back into the crank case 56. At the same time when sufficient pressure is exerted in the chamber 28, part of the oil may be constantly purified by filtering out the finer particles of impurities and directing the filtered lubricant through the passageway 27 in the pipe 23 to the connection 61 at the upper portion of the crank case reservoir 56.

By closing the valve 25 and fully opening the valves 24 and 20, free flow of the oil will be permitted through the pipe 19 into the casing 4 and from the interior of the chambers 21 of the porous filter elements through the pipe 23 back into the crank case, but it should be understood that the flow of the oil through the porous filter units is extremely restricted so as to secure the desired filtration of the very fine particles of impurities in the lubricant.

In order to secure the desired pressure for operation of the porous filter units the valve 60 may be partially closed to restrict the flow through the pipe 52 to the engine bearing connections 59, thereby causing back pressure in the casing 4 to secure the requisite pressure to force the oil through the porous disc elements 9. This increased pressure in the casing 4 will be indicated by the filter gauge 53. Although the flow through the valve 60 is restricted, the circulation to the engine bearings will not be cut off, but will go on continuously. By observing the bearing gauge 51, as well as the filter gauge 53 and operating the valves 20 and 60, the desired regulation may be secured so that while the engine is operating its lubrication may go on continuously and at the same time sufficient pressure is produced in the chamber 28 to effect filtration of the finest particles of impurities while the screen filter is taking out the coarser particles of impurities.

It should be noted that, if desired, the lubrication of the internal combustion engine may go on to its maximum extent while the engine is in operation and driving a load, but when it is disconnected from the load and running idly the valve 60 may be partially closed so as to greatly restrict the flow of the oil through the pipe 52 and thereby create sufficient pressure in the casing 4 to operate the porous filtering mechanism.

We prefer to mount the tank or casing 4 at such an elevation that the filtered oil may flow from the porous filter units by gravity through the pipe 23 to the connection at 61 at the upper portion of the crank case reservoir 56.

Obvious those skilled in the art may make various changes in the details and arrangement of parts without departing from the spirit and scope of the invention as defined by the claims hereto appended and we wish therefore not to be restricted to the precise construction herein disclosed.

We do not herein claim the method of continuously purifying and using lubricating oil, since the same forms the subject-matter of our co-pending application, Serial Number 634,886, filed the twenty-sixth day of September, 1932. We do not herein claim the subject-matter of invention involving the filtering mechanism per se, since the same forms the subject-matter of our co-pending application, Serial Number 294,213, filed July 20, 1928, but, having now fully disclosed an embodiment of our filter in conjunction with a circulating system including a lubricant forcing means, and a part to which cleansed lubricant is delivered.

What we desire to secure by Letters Patent of the United States is:

1. In oil purifying apparatus for lubricating oil of internal combustion engines, the combination with a crank case reservoir, of a pump therein adapted to be operated by the engine, a casing for receiving used lubricant from said crank case reservoir by means of said pump, means in said casing for filtering the coarser impurities from the used lubricant and directing such filtered lubricant to the engine bearings, and another filtering means in said casing and connected in a by-pass for filtering the finer impurities from used lubricant and directing the filtered lubricant back to the crank case reservoir.

2. In filtering apparatus for oil, the combination of an oil reservoir, of a closed oil tank, a filter in the upper portion of the tank for removing the coarser impurities from the used oil, another filter in the lower portion of the tank for removing the finer impurities from the used oil, a pump for pumping used oil from the reservoir to said tank, a connection from one of the filters to a remote delivery point for the filtered oil, and a connection from the other filter to the reservoir.

3. In filtering apparatus for lubricating oil of engines, the combination with an oil tank, of an oil reservoir, a filter in said tank adapted to remove the coarser impurities from the lubricant, a pipe connecting said filter to the engine bearings, another filter in said tank for removing the finer impurities from used lubricant, means for pumping used lubricant from said reservoir to said tank to operate said second-named filter under pressure, and a valve in said pipe for restricting the flow to the engine bearings to effect the building up of hydraulic pressure in said tank to operate said second-named filter, and means for directing filtered oil from said second-named filter back to the engine.

4. In filtering apparatus, the combination with a tank, of a pressure gauge connected to the interior of said tank, a reservoir, a pump connected to said tank for pumping fluid to be purified from said reservoir under pressure to said tank, separate filters in said tank one for removing the coarser impurities and the other for removing the finer impurities from the fluid, a pipe connected between a remote filtered oil delivery station and the filter for removing the coarser impurities, a valve for controlling the flow in said pipe and the hydraulic pressure in said tank, a pressure gauge connected to said pipe and to said last-named filter, and a pipe connected between the reservoir and the filter for removing the finer impurities to direct filtered fluid back to said reservoir independently of the flow of fluid to the remote delivery station from the filter removing the coarser impurities.

5. In oil purifying apparatus for lubricant, the combination with a reservoir, of a filter, means for directing oil from said reservoir through said filter to the parts to be lubricated to remove the coarser impurities from the lubricant before being used, a second filter, and a by-pass circulating conduit from the said reservoir through said second filter back to the reservoir to remove the finer particles of impurities in used lubricant.

6. In oil purifying apparatus for lubricants, the combination with a pump adapted to withdraw impure lubricant from a reservoir, of connections between said pump and a remote purified oil delivery station, a filter in series with said connections to receive all of the lubricant pumped by said pump through said connections, and a by-pass filter adapted to be connected to said reservoir to operate in parallel with the aforesaid connections and the first-named filter therein.

7. In an engine lubricating system, the combination with a filter, of means for directing lubricant through said filter to the engine to be lubricated, a second filter, connections for by-passing some of the lubricant through said second filter, and means for restricting the flow through said directing means to increase the flow through said by-passing connections.

8. In an engine lubricating system, the combination with a pump, of a filter, a connection between the filter and the engine to be lubricated, a second filter, a connection between said pump and both of said filters to direct used lubricant to both filters simultaneously, means for regulating the flow from the first-named filter to the engine to effect regulation of pressure on the second-named filter, and a connection between the second-named filter and the pump in by-pass relation to said first-named filter and the connection therefrom to the engine.

9. In an engine lubricating system, the combination with a pump, of a filter, a pipe connecting said pump to said filter, a pipe connecting said filter to the engine to be lubricated, a second filter connected to said first-named pipe, a connection between said second filter back to said pump, and a valve in said second-named pipe to control the liquid pressure on said second filter by restricting the flow in the pipe leading from said first-named filter to the engine.

10. In an engine lubricating system, the combination with a crank case, of a filter, means for directing lubricant through said filter to the engine to be lubricated, a second filter mounted in elevated position relative to said crank case, a connection between said second filter and said crank case to direct flow by gravity from said second filter to said crank case, and means for directing flow of used lubricant through said second-named filter in by-pass relation to the flow through said first-named filter.

11. In an engine lubricating system, the combination with a crank case reservoir, of a screen filter, means for circulating lubricant from the crank case through said screen filter to the engine to be lubricated and back to the crank case, another filter having a multiplicity of minute pores necessitating hydraulic pressure for its operation, and means connecting said last-named filter to said crank case in by-pass relation with circulating means.

12. In an engine lubricating system, the combination with a crank case, of a filter, means for directing lubricant through said filter to the engine to be lubricated, a gauge for indicating liquid pressure in the connection between said filter and the engine, means for controlling the flow in said connection, and by-pass filtering mechanism connected to said crank case.

13. In an engine lubricating system, the combination with a filter, of means for directing lubricant through said filter to the engine to be lubricated, a gauge connected to said filter to indicate the pressure of the liquid after passing through said filter, means for controlling the flow from the filter and regulating such pressure, a second filter connected to said directing means to operate in multiple with said first-named filter, a gauge connected to said second filter to indicate the liquid pressure on the inlet side thereof, and a connection for by-passing the liquid through the second filter relatively to the flow through said first-named filter.

14. In an engine lubricating system, the combination with a crank case reservoir, of a filter for the coarser impurities, a pump connected to said crank case, connections for directing lubricant pumped by said pump from said crank case through said filter to the engine bearings and back to said crank case, a second filter removing the finer impurities, connections for by-passing some of the lubricant pumped by said pump through said second filter back to the crank case, means for controlling the liquid pressure on said second filter, and means for indicating the pressure of the liquid flowing from said first-named filter and the liquid pressure on the second filter.

15. In a purifying apparatus for lubricants, the combination with a reservoir, of a lubricant circulating system connected with said reservoir and a device to be lubricated, a filter in said circulating system for removing the coarser impurities from the lubricant, a by-pass for directing lubricant back to the reservoir, and a second filter in the by-pass for removing the finer impurities from the lubricant, said filters being connected to operate in multiple.

16. In a purifying apparatus for lubricants, the combination with a reservoir, of a pump, a casing for receiving used lubricant pumped by said pump from said reservoir, two separate filters immersed in the lubricant in said casing, one filter being adapted to remove the coarse impurities from the lubricant and the other being adapted to remove the finer impurities from said lubricant, a pipe connecting one filter to a device to be supplied with purified lubricant and another pipe connecting the other filter back to the reservoir, said filters being operable simultaneously and in multiple during the operation of said pump.

17. In a lubricant purifying system, the combination with a reservoir, of a circulating system, a filter, means for connecting said filter to said reservoir in by-pass relation to said circulating system, and means for controlling the flow in the circulating system to regulate the hydraulic pressure exerted on said filter.

18. In a lubricant purifying system, the combination with a reservoir, of a circulating system comprising a pump for supplying lubricant from said reservoir to a remote point in which it is desired to apply the purified lubricant, a filter for removing the finer impurities from the lubricant, said filter comprising a multiplicity of minute pores and operable by hydraulic pressure, means for connecting said filter to said reservoir in by-pass relation to said circulating system, means for restricting the flow in said circulating system to secure increased hydraulic pressure on the filter to operate the same, and a pipe connected between said filter and the reservoir to permit the filtered lubricant to flow by gravity from the filter to the reservoir.

19. In purifying apparatus for lubricants, the combination with a reservoir, of a receiving casing, means for circulating lubricant from said reservoir through said casing, filtering means in said casing for removing the coarser impurities from the lubricant, additional filtering means in said casing for removing the finer impurities from said lubricant, means for directing lubricant from one filtering means to a remote purified oil receiving station, and means for directing lubricant from the other filtering means back to said reservoir.

20. In apparatus for purifying lubricants, the combination with a reservoir, of means for supplying lubricant from said reservoir to a remote pure oil receiving station comprising a filter for removing the coarser impurities from used lubricant, means comprising a second filter for removing the finer impurities from used lubricant, means for discharging filtered lubricant from one of said filters to the remote pure oil receiving station, means to connect the other filter for discharge directly to said reservoir, and means for connecting said filters for operation in multiple simultaneously.

21. In a purifying system for the oil used in an engine, comprising in combination with an oil reservoir associated with the engine, of a coarse filter capable of removing deleterious particles of size sufficient to injure the parts to be lubricated, a fine filter capable of removing deleterious particles of less size than those removed by the first-named filter, means to deliver oil from said reservoir to and passing same through said filters, means for returning the oil from the coarse filter through the parts to be lubricated and thence to the reservoir whereby to continuously deliver oil in sufficiently pure condition to provide adequate lubrication at all times to the lubricated parts, and means to return the oil from the fine filter back to the reservoir whereby to continuously maintain the oil in condition substantially cleaner than actually required for adequate lubrication.

22. In an oil purifying system for an engine, the combination with an oil reservoir associated with the engine, of means to supply lubricant from said oil reservoir to a part of the engine to be lubricated and thence back to the reservoir, a filter for removing relatively coarse impurities from the oil delivered to the part to be lubricated in order to deliver the oil in sufficiently clean condition to provide adequate lubrication, means comprising a second filter to remove solids of a fineness capable of passing the first-named filter, and means to circulate oil between the second filter and the reservoir without passing the lubricated parts in order continuously to maintain the oil in the reservoir in a condition substantially clearer than actually required for adequate lubrication and to relieve the load on the first filter.

23. In a lubricating system for an engine having a body of oil exposed to contamination by a deleterious solid, means to continuously circulate oil from said body through a filtering means adapted to filter out the coarser impurities in order to deliver partially filtered lubricant in sufficiently pure condition to provide adequate lubrication at all times for the engine parts to be lubricated, and means to circulate oil from said body through another filtering means adapted to filter out substantially all of the deleterious solids and return the oil to the body in order to maintain the body of oil substantially free of deleterious solids of a fineness capable of passing the first-mentioned filtering means.

24. In a purifying system for the oil used in an engine, comprising in combination with an oil reservoir associated with the engine, of a coarse filter capable of removing deleterious particles of size sufficient to injure the parts to be lubricated, a fine filter capable of removing deleterious particles of less size than those removed by the first-named filter, means to deliver oil from said reservoir to and passing same through said filters, means for returning the oil from the coarse filter through the parts to be lubricated and thence to the reservoir whereby to continuously deliver oil in sufficiently pure condition to provide adequate lubrication at all times to the lubricated parts, means to return the oil from the fine filter back to the reservoir whereby to continuously maintain the oil in condition substantially cleaner than actually required for adequate lubrication, and control means operable to restrict the flow through the coarse filter to cause a large amount of oil to flow through the fine filter, whereby to increase the purifying effect of the fine filter.

25. In a lubricating system for an engine having a body of oil exposed to contamination by deleterious solids, the combination with a reservoir for said oil, of means forming a pair of filters, one of which is relatively coarse and the other of which has substantially microscopic filtering passages, means to force oil from said reservoir to said filters at pressure sufficiently high to force at least a part of said oil through the microscopic channels of the relatively fine filter, the remaining oil being delivered to the relatively coarse filter, said coarse filter being adapted to remove the coarser solids in order to deliver partially filtered lubricant in sufficiently pure condition to provide adequate lubrication at all times for the engine parts to be lubricated, means to circulate oil discharged through said relatively coarse filter through the engine parts to be lubricated and thence back to the reservoir, and means to return the oil delivered through the relatively fine filter back to the reservoir whereby to continuously deliver oil in sufficiently pure condition to provide adequate lubrication at all times to the lubricated parts and to continuously maintain the oil in the reservoir in a condition substantially cleaner than is actually required for adequate lubrication of the parts.

26. In an oil purifying system for an engine, having a body of oil exposed to contamination by deleterious solids, the combination with a reservoir for said oil, of means forming a relatively coarse and a relatively fine filter, the coarse filter being adapted to remove the coarser solids from oil passed therethrough, in order to deliver oil in sufficiently clean condition free from deleterious solids to provide adequate lubrication at all times for the engine parts to be lubricated and said fine filter having filtering channels of substantially microscopic capillary size adapted to remove from oil forced therethrough relatively fine particles of deleterious solids, means for circulating oil from said reservoir to said filters, means for directing lubricant from one of the filters to the parts of the engine to be lubricated and thence back to the reservoir, and means for directing oil from the other filter back to said reservoir, said filters being arranged for operation in multiple whereby a part of the oil delivered to the filters passes through the fine filter while the remainder of the oil so delivered passes through the coarse filter.

In testimony whereof we have signed our names to this specification on this 30 day of July, A. D. 1929.

PAUL B. RENFREW.
LEE R. HARTLEY.